G. SEACH.
ANTISKID DEVICE.
APPLICATION FILED FEB. 13, 1914.
1,135,854.
Patented Apr. 13, 1915.
2 SHEETS—SHEET 1.
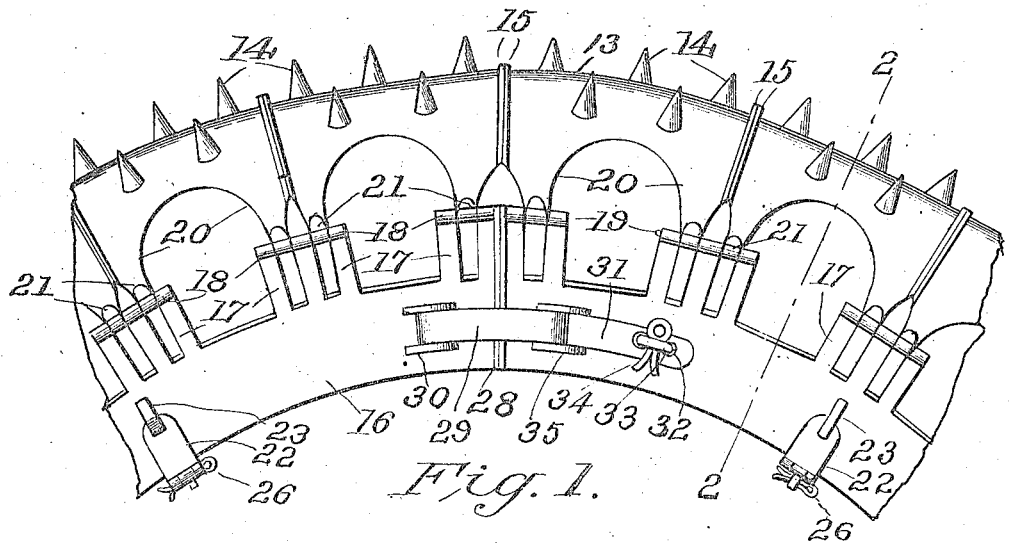
Fig. 1.
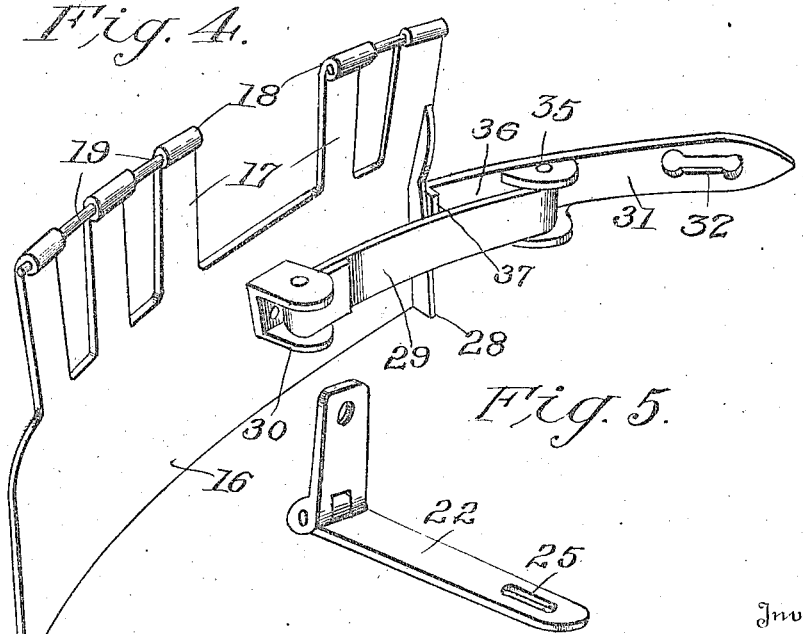
Fig. 4.
Fig. 5.
Witnesses
Inventor
George Seach
By A. M. Wilson
Attorney

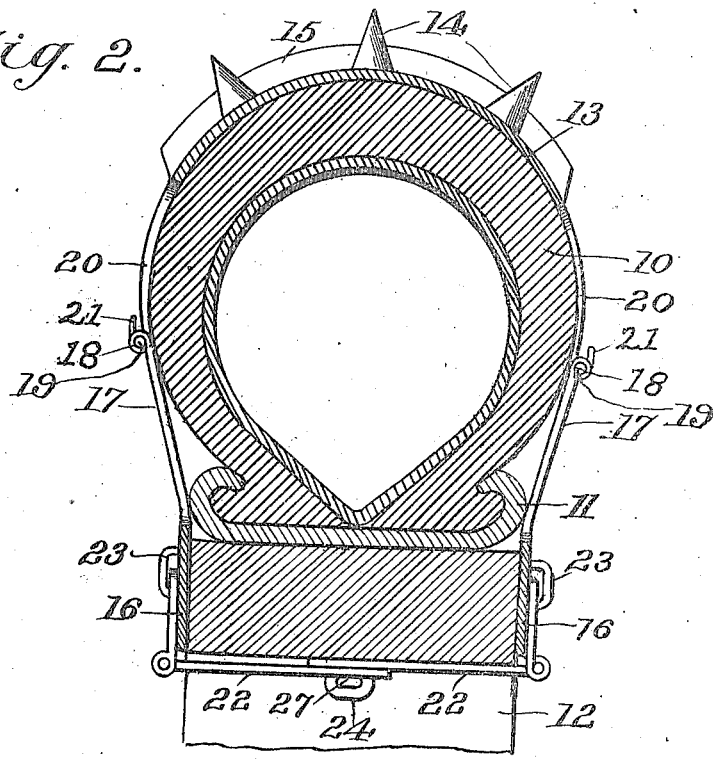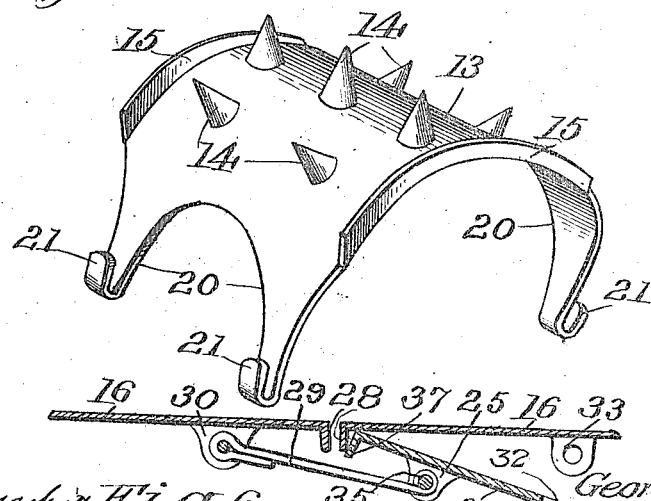

UNITED STATES PATENT OFFICE.

GEORGE SEACH, OF DUBOIS, PENNSYLVANIA.

ANTISKID DEVICE.

1,135,854.  Specification of Letters Patent.  Patented Apr. 13, 1915.

Application filed February 13, 1914. Serial No. 818,510.

*To all whom it may concern:*

Be it known that I, GEORGE SEACH, a subject of the Emperor of Austria-Hungary, residing at Dubois, in the county of Clearfield and State of Pennsylvania, have invented certain new and useful Improvements in Antiskid Devices, of which the following is a specification.

This invention relates to improvements in non-skidding devices for automobile tires.

The primary object of the invention is the provision of positive means readily assembled upon the tread portion of a tire, and as easily removed therefrom, which will give a positive traction grip to the wheel, thus preventing any possible side slipping or skidding of the vehicle.

A further object is to provide a removable tire armor in several sections, each of which is clamped to the wheel while the sections are assembled with leverage clamping devices positioned therebetween.

A still further object is to provide a tire armor which substantially incloses the entire tread portion of the tire and provides a traction surface therefor composed entirely of metal and is locked together and to the wheel by separate transverse and longitudinal leverage clamping hasps.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and in which like designating characters refer to corresponding parts throughout the several views:—

Figure 1 is a side elevation of a portion of a tire with the present device assembled thereon. Fig. 2 is a transverse sectional view taken upon line 2—2 of Fig. 1. Fig. 3 is a perspective view of one of the tread plates detached. Fig. 4 is a perspective view of one of the side bands showing the hasp clamping lever thereof. Fig. 5 is a perspective view of one of the transverse hasps, and, Fig. 6 is a longitudinal sectional view through the adjacent ends of two side bands and illustrating the operation of the lever clamping hasp.

Referring more in detail to the drawings, it is to be noted that while the present device is employable upon the periphery of any form of wheel to prevent all slipping thereof and to insure the best traction properties, the invention is herein illustrated as mounted upon a pneumatic tire 10 positioned within the usual clencher rim 11 upon a wooden felly 12.

The separate arch-shaped tread plates 13 are adapted to span the tread portion of the tire 10 and each has a desired number of studs 14 projecting from the outer convex surface thereof while an outwardly projecting flange 15 is positioned at the ends of each plate for allowing the adjacent plates to abut thereagainst as best shown in Fig. 1.

Side bands 16 preferably eight in number, are adapted for arrangement circumferentially of the wheel and positioned against the opposite outer faces of the felly 12.

The band 16 has a plurality of upwardly-extending arms 17 having overturned tops 18 for rigidly mounting therein the pintles 19 and being similar to the leaf and pintle of a hinge formation. The tread plates 13 have oppositely and downwardly extending arms 20, the ends of which are inturned as at 21 around the pintles 19 in a grasping hinged relation.

It will be noted that while the side bands 16 are preferably provided four in number upon each side of the wheel, although a greater or less number of the same may be employed if desired, the tread plates 13 are of a much less length so that a plurality of said plates are hinged to a single side band upon each side thereof.

The adaptation of said plates hinged to the opposite bands to seat upon the tire is believed to be apparent from the drawings as well as the serviceability of the device by reason of the flexibility of all of the connections and contact points.

In retaining the sections or the non-skid member upon the wheel, transverse hasps 22 are provided linked at alining points upon the outer faces of the opposite side bands by suitable staples 23. Said hasps are provided in pairs, one of each pair having an upstanding perforated lug or staple 24 adjacent the end thereof and adapted for reception through a receiving slot or eyelet 25 adjacent the end of the coöperating hasp and whereby the two hasps may be joined and locked by the insertion of a locking member such as the cotter 26 through this eye 27 of the lug 24. This mounting of the plates and side bands around the tire and securing the same by the transverse hasp locks requires a further locking member for retaining the entire structure now consisting of the four separate parts, and of which the four pairs of side bands form the base. For this purpose, each side band having an outwardly projecting end flange 28 adapted to abut with the similar flange of the adjacent band has a strap 29 hinged thereto by means of the block 30. The free end of each strap is provided with a lever 31 pivoted thereto while one end of said lever has the slot or eye 32 adapted to receive the staple 33 mounted upon the adjacent side band and after the manner of a hasp formation and being also provided with a cotter pin 34 to retain the lever end upon such staple.

The pivot point 35 of said lever is removed from both ends thereof and provides a short end 36 opposite to its slotted end while said short end terminates in an upturned flange 37.

With the tread plates and side bands properly assembled upon the tire, and with the hasp 22 secured in place by their cotter pins, the adjacent ends of the separate sections will be slightly separated, leaving the flanges 28 a short distance apart so that a movement of the lever 31 as shown in Fig. 6, will position the end flange 37 of the short arm thereof in contact with the end flange 28 of the adjacent side band and thus by a downward closing movement of the lever for engaging its slot with the staple 33, results in a suitable leverage for forcing the two plates 16 toward and in contact with each other with their end flanges 28 in proper abutment as well as with the flanges 15 of the carried tread plates also in engagement.

The complete operation both of placing the device upon the wheel as well as quickly and readily removing the same therefrom will be at once apparent, while it is also to be understood that changes may be made in the form of the device as well as the material employed which however is preferably metal, without departing from the spirit and scope of the invention.

What I claim as new, is:—

1. A tire armor comprising circular side retaining bands made up of segments having terminal flanges, armor sections secured to each pair of segments, and flanges on said sections radially alined with those of the segments, and means for forcing the flanges of the segments into abutting relation.

2. A tire armor comprising circular side-retaining bands made up of segments having terminal flanges, armor sections secured to each pair of segments by a connection flexible only in the plane of the wheel, and means for forcing the flanges of the segments into abutting relation.

3. A tire armor comprising circular side-retaining bands made up of segments having terminal flanges, armor sections secured to each pair of segments having radial bearing faces alined with the flanges, and means for forcing the flanges of the segments into abutting relation.

In testimony whereof I affix my signature in presence of two witnesses.

GEORGE SEACH.

Witnesses:
J. G. BOGDEN,
PETER LOSTESKI.